United States Patent [19]

Haranishi

[11] Patent Number: 4,846,596
[45] Date of Patent: Jul. 11, 1989

[54] EXPANSION ELECTRONIC EQUIPMENT

[75] Inventor: Noriaki Haranishi, Tokyo, Japan

[73] Assignee: Canon Kabushiki Kaisha, Tokyo, Japan

[21] Appl. No.: 251,004

[22] Filed: Sep. 27, 1988

Related U.S. Application Data

[63] Continuation of Ser. No. 104,560, Sep. 29, 1987, abandoned, which is a continuation of Ser. No. 21,552, Mar. 2, 1987, abandoned, which is a continuation of Ser. No. 675,659, Nov. 28, 1984, abandoned.

[30] Foreign Application Priority Data

Dec. 8, 1983 [JP] Japan ................................. 58-230642

[51] Int. Cl.$^4$ .............................................. B41J 29/02
[52] U.S. Cl. ................................. 400/692; 174/35 R; 365/53
[58] Field of Search ...................... 174/35 R; 361/424; 365/2, 53; 411/337, 352, 353, 366, 424; 400/61, 63, 66, 67, 74, 691, 692, 693, 694

[56] References Cited

U.S. PATENT DOCUMENTS

| 3,927,397 | 12/1975 | Chow et al. | 365/2 |
| 4,339,628 | 7/1982 | Marcantonio et al. | 361/424 X |
| 4,388,010 | 6/1983 | Mott et al. | 400/692 |
| 4,481,556 | 11/1984 | Berke et al. | 400/691 X |
| 4,482,981 | 11/1984 | Morimoto et al. | 400/110 X |

FOREIGN PATENT DOCUMENTS 124901  9/1979  Japan ................................. 174/35 R Primary Examiner—Charles Pearson
Attorney, Agent, or Firm—Fitzpatrick, Cella, Harper & Scinto

[57] ABSTRACT

An expansion electronic equipment adapted to be attached to a main electronic equipment comprises locking means fixed to one end of the expansion electronic equipment and adapted to be locked by the main electronic equipment, opening means formed at the other end of the expansion electronic unit spaced from the one end, and fixing means having a head of a larger diameter than a diameter of the opening means and a flange of a larger diameter than the diameter of the opening means. The fixing means fixes the expansion electronic equipment to the main electronic equipment by engaging to the opening means by the head and the flange.

14 Claims, 3 Drawing Sheets

EXPANSION ELECTRONIC EQUIPMENT

This application is a continuation of application Ser. No. 104,560, filed 9/29/87, now abandoned, which iss a continuation of application Ser. No. 021,552, filed 3/2/87, now abandoned, which is a continuation of application Ser. No. 675,659, filed 11/28/84, now abandoned.

BACKGROUND OF THE INVENTION

1. Field of the Invention

The present invention relates to electronic equipment or an electronic device, and more particularly to electronic equipment accommodated in a case and that may be externally mounted on a main electronic apparatus by a screw member.

2. Description of the Prior Art

When an exchangeable ROM unit as an expansion electronic device is to be externally mounted on a main electronic apparatus such as an electric typewriter or a personal computer, it is necessary that the ROM unit be provided with a shield effect for shielding noise. If a case of such a unit has no noise shielding function, it is necessary to attach a separate shield plate to the case and electrically connect the shield plate to the typewriter body to ground it.

In mounting such a ROM unit on the electric typewriter, a screw member has been used.

However, in electronic equipment and devices such as a ROM unit which are to be externally mounted on the main electronic apparatus by the screw member, the screw member is frequently dropped and lost when the electronic device is exchanged. Further the shield plate must be grounded to the main electronic apparatus at each exchange.

SUMMARY OF THE INVENTION

It is an object of the present invention to provide electronic equipment or an electronic device having a shield plate which has an engaging groove for holding a cylindrical portion of a screw member below a head thereof so that when the shield plate is mounted on a case the screw member with the engaging groove is held in place to prevent its loss, the screw member acting to electrically connect the shield plate to a main electronic apparatus to ground the shield plate.

It is another object of the present invention to provide expansion electronic equipment which has an expansion electronic circuit connectable to an electronic circuit in a main electronic apparatus and which is removably mounted on the main electronic apparatus. The equipment has a case having a shield member attached thereto, a screw member being attached to the case through the shield member so that the case is threadedly mounted on the main electronic apparatus, the expansion electronic circuit being accommodated in the case and the shield member being electrically connected to the main electronic apparatus for grounding when the case is threadedly mounted on the main electronic apparatus.

DETAILED DESCRIPTION OF THE PREFERRED EMBODIMENTS

Figure 1:
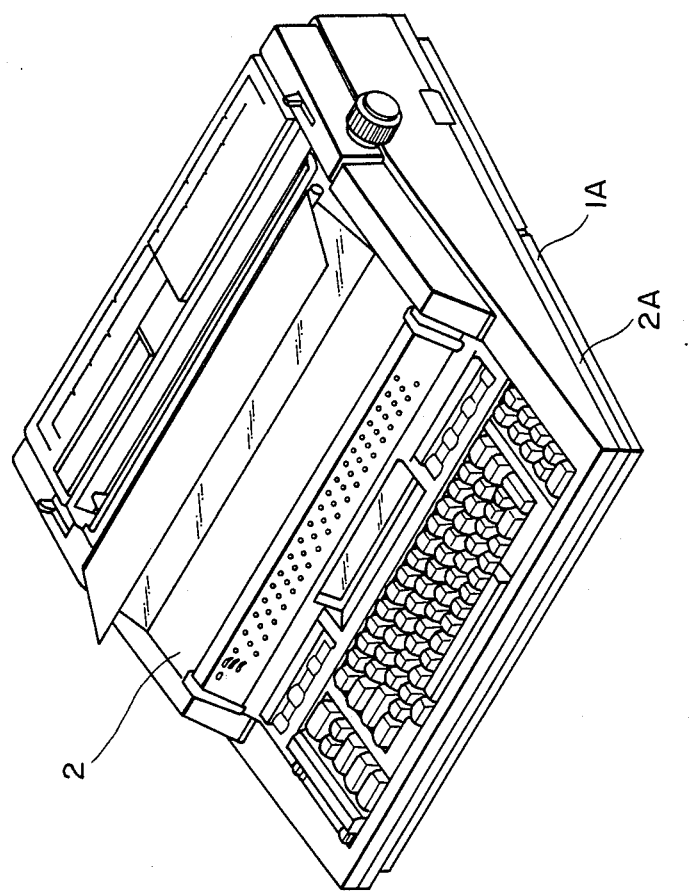
FIG. 1 is a perspective view of an electric typewriter having electronic equipment of the present invention mounted thereto.
Figure 2:
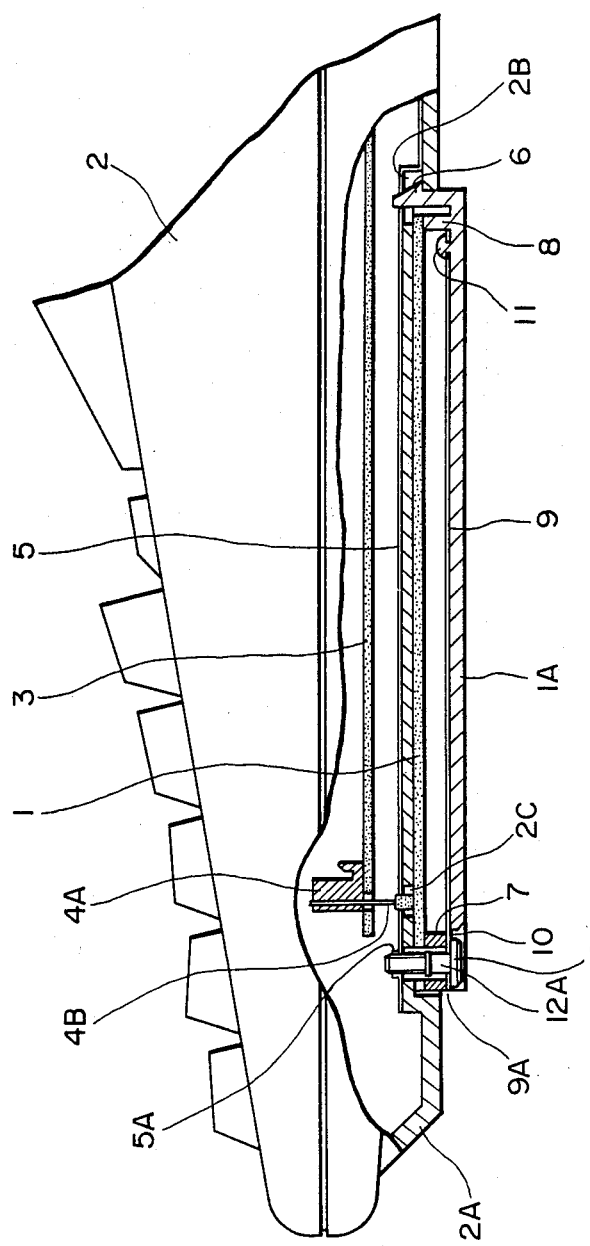
FIG. 2 is a sectional view of one embodiment of the electronic equipment of the present invention.

FIGS. 1 and 2 show one embodiment of the present invention. FIG. 1 shows an electric typewriter as the main electronic apparatus to which a ROM unit as electronic equipment of the present invention is mounted. Numeral 1A denotes a unit case which is mounted to a bottom of a case 2A of the electric typewriter 2 and which holds an exchangeable ROM unit (not shown in FIG. 1) therein. The unit case 1A holds the ROM unit 1 as shown in FIG. 2. The ROM unit 1 may contain, for example, a dictionary or a font.

Referring to FIG. 2, numeral 3 denotes a CPU in the typewriter 2, numeral 4A denotes a connector for the CPU 3, numeral 5 denotes a shield plate attached to an inner side of the case 2A and numeral 4B denotes connector pins of the ROM unit 1. When the unit case 1A is mounted to the bottom of the case 2A, the CPU 3 and the ROM 1 are connected through the connector 4A and the connector pins 4B.

Numeral 2B denotes a hole formed at the bottom of the case 2A through which the ROM case 1A is mounted, numeral 2C denotes a guide hole for the connector pins 4B and numeral 5A denotes a threaded bore formed in the shield plate 5. On the other hand, formed in the unit case 1A are a locking pawl 6, unit holding plates 7 and 8, a slit 10 in which a connecting portion 9A of a ROM shield plate 9 is inserted and an engaging projection 11 to which an end of the shield plate 9 is attached. Numeral 12 denotes a fixing screw member.

Figure 3:
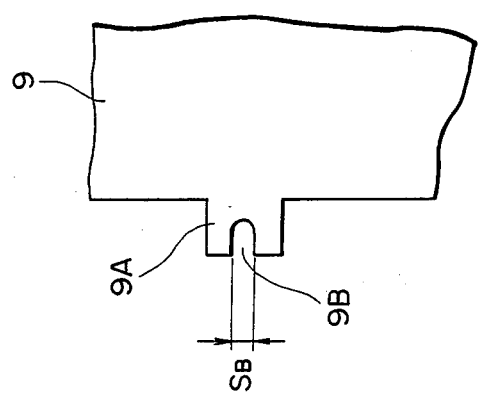
FIG. 3 is a plan view showing a connection of a shield plate.
Figure 4:
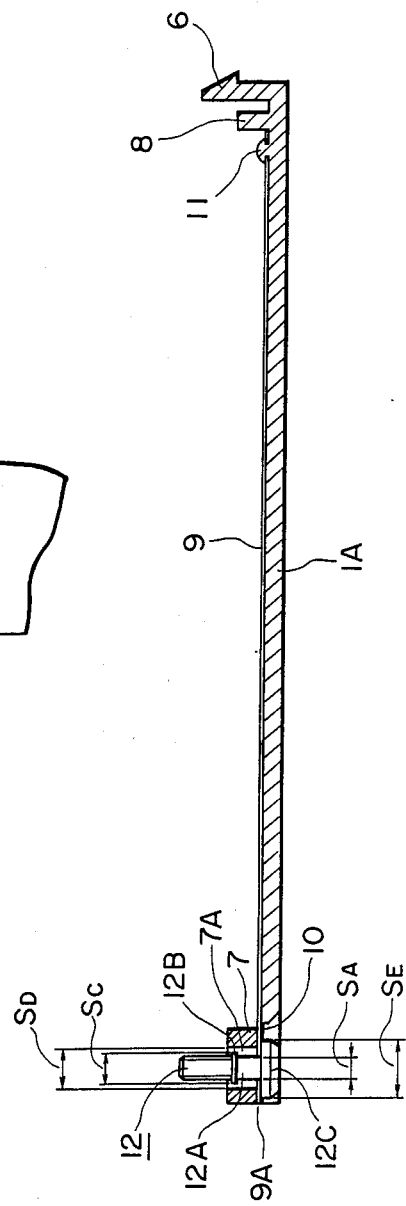
FIG. 4 is a sectional view showing the shield plate and a screw member mounted to a case of the electronic equipment of the present invention.

A U-shaped engaging groove 9B as shown in FIG. 3 is formed in the connecting portion 9A of the shield plate 9, and a guide hole 7A is formed in the holding plate 7 of the case 1A at a position facing the engaging groove 9B, as shown in FIG. 4. A cylindrical portion 12A of the screw member 12 under a head thereof and a flange 12B formed on the cylindrical portion 12A are loosely mounted in the guide hole 7A.

A width $S_B$ of the engaging groove 9B is selected to be smaller than a diameter $S_C$ of the flange 12B of the screw member 12 and larger than a diameter $S_A$ of the cylindrical portion 12A.

The screw member 12, the guide hole 7A of the holding plate 7 and the engaging groove 9B of the shield plate 9 have diameters that meet the following relationship:

$$S_A < S_B < S_C < S_D < S_E \qquad (1)$$

where $S_D$ is a diameter of the guide hole and $S_E$ is a diameter of the head 12C of the screw member 12.

In attaching the ROM unit 1, the ROM unit 1 is connected to the CPU by the connector pins 4B and the connector 4A and the connecting portion 9A of the shield plate 9 is inserted into the slit 10 of the unit case 1A. Then, the cylindrical portion 12A of the screw member 12 is fit to the engaging groove 9B of the shield plate 9 shown in FIG. 3.

When the shield plate 9 is attached to the case 1A in this manner, the cylindrical portion 12A of the screw member 12 is held by the engaging groove 9B against being dislodged because it is bounded by the flange 12B and the head 12C so that dislodging of the screw member is prevented when the case 1A is attached or removed for the exchange of the ROM 1.

Next, the locking pawl 6 of the case 1A is inserted into the locking hole 2B of the case 2A to lock it so that the holding plates 7 and 8 and the ROM 1 are held, and the screw member 12 is threaded into the threaded bore 5A formed in the shield plate 5. In this manner, the ROM 1 is attached to the electric typewriter 2.

In this condition, the shield plate 9 of the ROM 1 and the shield plate 5 of the main electronic apparatus are electrically connected through the screw member 12 and the shield plate 9 is grounded through the shield plate 5 which is grounded at a position (not shown) so that the shield plate 9 is provided with a sufficient shield effect.

In accordance with the present invention, in electronic equipment adapted to be externally mounted to a main electronic apparatus by the screw member together with the shield plate held by the case, the cylinder portion of the screw member is provided with the flange and the shield plate is provided with the engaging groove which is insertable to only the diameter of the cylinder portion of the screw member, and the cylinder portion of the screw member bounded by the head and the flange thereof is inserted into the engaging groove so that when the shield plate is mounted to the case the screw member is prevented from being dislodged by the head and the flange. Accordingly, when electronic equipment is exchanged, there is no risk of dropping or losing of the screw member. Further, since the shield plate is threadedly mounted to the shield plate of the main electronic apparatus by the screw member through the case, the shield plate is grounded and the sufficient shield effect is attained.

What is claimed is:

1. An expansion electronic equipment for mounting an auxiliary unit for use with a main electronic equipment, comprising:
   locking means fixed to one end of said expansion electronic equipment and adapted to be locked by said main electronic equipment;
   a unit holding rest provided on a side adjacent said locking means at the one end of said expansion electronic equipment for holding said auxiliary unit to be used with said main electronic equipment;
   shield means having a fitting hole at one end thereof and a connecting portion, including an engaging groove, at the other end thereof for shielding the auxiliary unit and adapted to be attached to said main electronic equipment;
   an engaging projection provided on a side adjacent said unit holding rest at the one end of said expansion electronic equipment for fitting to said hole of said shield means;
   a cutaway portion formed at the other end of said expansion electronic equipment spaced from said one end;
   fixing means having a head, a cylindrical portion, and a flange of a smaller diameter than the diameter of said cutaway portion, said fixing means being arranged for fixing said expansion electronic equipment to said main electronic equipment by engaging said cutaway portion; and
   holding means formed at the other end of said expansion electronic equipment on a side opposite said cutaway portion and having a unit holding stand including a top surface thereof for holding said auxiliary unit, a guide hole for said fixing means and a slit for receiving said shield means therein with said cylindrical portion of said fixing means received in said engaging groove of said shield means, for holding said fixing means to prevent said fixing means from being dislodged from said cutaway portion when said fixing means is engaged with said cutaway portion.

2. An expansion electronic equipment according to claim 1 wherein said fixing means is a screw.

3. An expansion electronic equipment according to claim 1 wherein said auxiliary unit is a ROM containing a dictionary.

4. An electronic equipment comprising:
   main electronic equipment means;
   shield means for shielding an auxiliary unit in an expansion electronic equipment adapted to be attached to said main electronic equipment means;
   an engaging groove formed in said shield means;
   main shield means for shielding said main electronic equipment means, said main shield means being unable to physically contact said shield means;
   fixing means for fixing said expansion electronic equipment to said main electronic equipment means and electrically connecting said shield means to said main shield means;
   a cutaway portion formed at one end of said expansion electronic equipment; and
   holding means formed at the one end of said electronic equipment on a side opposite to said cutaway portion and having a unit holding stand including a top surface thereof for holding said auxiliary unit, a guide hole for said fixing means and a slit for receiving said shield means therein with a portion of said fixing means received in said engaging groove, for holding said fixing means to prevent detachment of said fixing means from said cutaway portion when said fixing means is engaged with said cutaway portion.

5. An electronic equipment according to claim 4 wherein said main shield means is grounded.

6. An electronic equipment according to claim 4 wherein said fixing means is a screw.

7. An electronic equipment according to claim 4 wherein said auxiliary unit includes a ROM.

8. An electronic equipment according to claim 4 wherein said expansion electronic equipment has a case covering an external periphery thereof, said case having shield fixing means for fixing said shield means.

9. An electronic equipment removably attachable to a main electronic equipment, said electronic equipment comprising:
   locking means fixed to one end of said electronic equipment and adapted to be locked by said main electronic equipment;
   a unit holding rest provided on a side adjacent said locking means at the one end of said electronic equipment for holding an auxiliary unit;
   shield means having a fitting hole at one end thereof and a connecting portion, including an engaging groove, at the other end thereof for shielding said auxiliary unit adapted to be attached to said main electronic equipment;
   an engaging projection provided on a side adjacent said unit holding rest at the one end of said electronic equipment for fitting to said fitting hole of said shield means;

a screw hole formed at the other end of said electronic equipment spaced from said one end;

a screw inserted into said screw hole in said electronic equipment, said screw having a head, a shank and a flange, said head, shank and flange being of a smaller diameter than the diameter of said screw hole; and a block-shaped member formed at the other end of said electronic equipment on a side opposite to said screw hole and having a top surface thereof for holding said auxiliary unit, a guide hole of diameter larger than the diameter of each of said shank, and flange of said screw and a slit for receiving said shield means therein, said shield means being fitted at a portion of said screw between said head and said flange so that said screw is confined loosely within said guide hole to prevent loss of said screw.

10. An electronic equipment according to claim 9, wherein said shield means comprises a shield member for said auxiliary unit and is formed from electrically conductive material.

11. An electronic equipment according to claim 9, wherein said screw comprises fixing means for detachably fixing said electronic equipment to said main electronic equipment.

12. An electronic equipment removably attachable to a main electronic equipment comprising:

a hole formed in said electronic equipment;

a screw having a head, a flange and a shank, the of diameter of each of which is smaller than that of said hole;

a plate-shaped member having a cutaway portion of diameter larger than that of said shank but of diameter smaller than the diameter of each of said head and flange of said screw and being insertable from a lateral side of said hole where when said screw is fit to said hole; and holding means formed on a side opposite said hole and having a top surface thereof for holding said auxiliary unit, a guide hole for said screw and a slit for receiving said plate-shaped member therein, for holding said plate-shaped member in the insertion direction of said plate-shaped member and holding said screw to prevent said screw from being dislodged from said hole when said screw is engaged with said hole.

13. An electronic equipment according to claim 12, wherein said plate-shaped member comprises a shield plate of said electronic equipment.

14. An electronic equipment according to claim 13, wherein said screw comprises connecting means for connecting said shield plate to a shield of said main electronic equipment.

* * * * *

UNITED STATES PATENT AND TRADEMARK OFFICE
CERTIFICATE OF CORRECTION

PATENT NO. : 4,846,596
DATED : July 11, 1989
INVENTOR(S) : Noriaki Haranishi

It is certified that error appears in the above-identified patent and that said Letters Patent is hereby corrected as shown below:

COLUMN 1
　　　Line 44, change "with the engaging " to --engaged with the--.

COLUMN 4
　　　Line 10, change "claim 1" to --claim 1,--.
　　　Line 12, change "claim 1" to --claim 1,--.
　　　Line 40, change "claim 4" to --claim 4,--.
　　　Line 42, change "claim 4" to --claim 4,--.
　　　Line 44, change "claim 4" to --claim 4,--.
　　　Line 46, change "claim 4" to --claim 4,--.

COLUMN 5
　　　Line 12, change "shank," to --shank--.

COLUMN 6
　　　Line 2, delete "of".
　　　Line 9, delete "where".
　　　Line 12, change "said" to --an--.

Signed and Sealed this

Eleventh Day of September, 1990

Attest:

HARRY F. MANBECK, JR.

*Attesting Officer*　　　*Commissioner of Patents and Trademarks*